April 24, 1951 J. F. WILCOX 2,550,510

FREQUENCY MODULATION DETECTOR CIRCUIT

Filed June 3, 1949

Inventor:
James F. Wilcox,
by Merton D. Moore
His Attorney.

Patented Apr. 24, 1951 2,550,510

UNITED STATES PATENT OFFICE 2,550,510

FREQUENCY MODULATION DETECTOR CIRCUIT

James F. Wilcox, Syracuse, N. Y., assignor to General Electric Company, a corporation of New York Application June 3, 1949, Serial No. 97,047

4 Claims. (Cl. 250—27)

Figure 1:
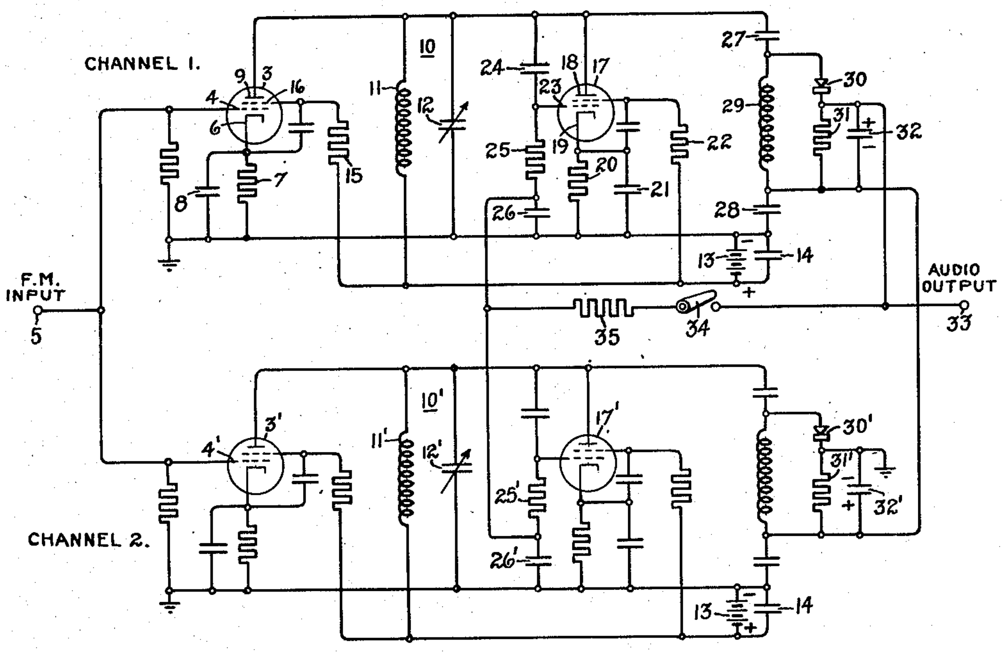

This invention relates to systems for receiving signals of the frequency or phase modulated type and particularly to demodulation or detector circuits employed in conjunction therewith.

In a frequency modulation communication system, the signal or intelligence conveyed by a carrier wave is present in the form of a frequency swing or instantaneous frequency deviation of the carrier. To receive the signal or intelligence, it is necessary to provide a detector circuit which translates these deviations in frequency into amplitude modulations proportional to the signal. Among the better known types of frequency modulation detectors are the balanced frequency discriminator and the ratio detector.

The primary requirement in a frequency modulation detector is that it provide an output current linearly proportional to the frequency deviation of a carrier wave. This requirement is satisfactorily met by the previously mentioned known detector circuits. However, such circuits commonly suffer from a rather restricted range of linear output. In other words, as soon as the range of frequency deviation of the carrier exceeds certain limits, distortion occurs in the demodulated output.

It is an object of this invention to provide a new and improved detector circuit for a frequency modulated wave.

Another object of my invention is to provide a frequency modulation detector circuit having a linear response over a wider frequency deviation of a carrier wave than heretofore possible.

For further objects and advantages and for a better understanding of the invention, attention is now directed to the following description and accompanying drawings. The features of the invention believed to be novel are more particularly pointed out in the appended claims.

In the drawing:

Fig. 1 is a schematic diagram of a frequency modulation detector circuit embodying my invention.

Figure 2:
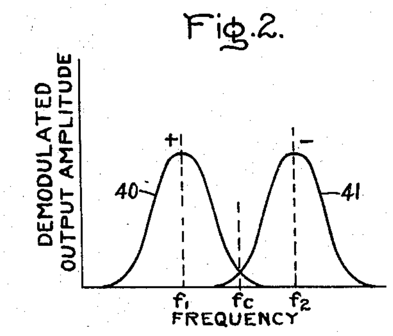
Figure 3:
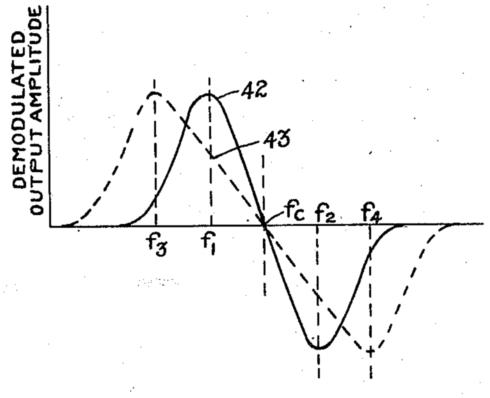

Fig. 2 and 3 contain curves illustrating certain operating characteristics of the circuit of Fig. 1.

In accordance with my invention, I provide two parallel channels for amplifying a frequency modulated wave, the channels being tuned to different frequencies, equally spaced on either side of the center frequency of a carrier. Each channel contains a resonant circuit having a reactance tube or modulator connected in parallel therewith, and is terminated by an amplitude detector, the output circuits of the detectors in both channels being connected in series-aiding relationship. The resultant output voltage, being the sum of the detected voltages, is proportional to the frequency swing of the carrier wave. This output voltage is then applied to the control electrodes of the reactance tubes in such a way that the tuning of the two channels changes, with the instantaneous frequency deviation, in the direction of the deviation. The effect of this action is to provide a substantial lengthening of the linear portion of the demodulation characteristic of the circuit.

Referring to Fig. 1, the circuit comprises a pair of channels 1 and 2, each containing an amplifying tube and a reactance tube. The amplifying tube in channel 1 is an electron discharge device 3 which has its control electrode 4 connected to an input terminal 5, and its cathode 6 connected to ground through a suitable biasing resistor 7 shunted by a capacitor 8. The anode 9 of device 3 is connected to a resonant circuit 10 comprising an inductance 11 and a variable tuning capacitor 12. Operating potential for device 3 is provided from a low impedance source, represented conventionally by a battery 13 shunted by a capacitor 14. Potential is supplied through inductance 11 to anode 9, and through a voltage dropping resistor 15 to a screen electrode 16.

An electron discharge device 17 serves as a reactance modulator in parallel with resonant circuit 10. Anode 18 of device 17 is connected to anode 9 of device 3, and accordingly is also provided with operating potential from battery 13 through inductance 11. Cathode 19 of device 17 is connected to ground through a suitable biasing circuit comprising a resistor 20 and a capacitor 21, and its screen electrode is provided with operating potential through a voltage dropping resistor 22 connected to battery 13.

The control electrode 23 of device 17 is connected to the junction of a capacitor 24 and a resistor 25 constituting a phase shifting network. Capacitor 24 is connected to the anode 9 of device 3, and resistor 25 is effectively connected to ground through a large capacitor 26. Capacitor 24 is selected to have a high reactance at the carrier frequency, in comparison with the resistance of resistor 25. Capacitor 26 has a low reactance, and its purpose will be explained subsequently. Since capacitor 24 has a high reactance, it constitutes the major portion of the impedance of the network. Accordingly, the current through the network leads the applied voltage by substantially 90°, and develops, across resistor 25, a quadrature voltage, which voltage is effective at control electrode 23 of device 17. In accordance with well known principles, device 17 then operates as a reactance modulator providing a quadrature current to the resonant circuit 10, and the magnitude of this current depends upon the operating bias at control electrode 23. In other words, device 17 operates as an equivalent reactance in parallel with circuit 10, and the value of this equivalent reactance may be controlled by varying the bias voltage at control electrode 23.

A detector circuit is connected in parallel with resonant circuit 10 through a pair of coupling capacitors 27 and 28. This detector circuit comprises a load inductance 29, a rectifier 30, which is of the crystal type but which may be a vacuum tube, a load resistor 31, and a high frequency bypass capacitor 32. The rectified output is taken from the junction of crystal 30 and resistor 31, and is available at an output terminal 33.

Channel 2 is connected in identical manner to channel 1 except for certain elements in the rectifier circuit. Accordingly, the circuit of channel 2 will not be described in detail, and the same reference numerals, characterized by a prime mark, will be utilized in describing the various components thereof.

The control electrode 4′ of device 3′ in channel 2 is connected, in parallel with control electrode 4 of device 3, to the input terminal 5. Crystal 30′ in the detector circuit of channel 2 has been connected so as to conduct in the opposite direction from crystal 30 in the detector circuit of channel 1. The result of a carrier wave being translated through both channels, with the crystal rectifier connections as shown in the drawing, is to charge the crystal side of capacitor 32 positively, and the crystal side of capacitor 32′ negatively. The junction of crystal 30′ and resistor 31′ in channel 2 is connected to ground, and the other side of resistor 31′ is connected to the corresponding side of resistor 31 in channel 1. These connections cause the output voltages from both crystals to combine additively, so that the resultant voltage at terminal 33 is the algebraic sum of the output voltages from both channels.

The audio output voltage at terminal 33 is fed back to the junction of resistor 25 and capacitor 26 in channel 1, and to the junction of resistor 25′ and capacitor 26′ in channel 2. The feedback is made through a switch 34 and a decoupling resistor 35, which serves to prevent possible regenerative feedback at frequencies in the range of the carrier frequency. Capacitors 26 and 26′ are selected to have a low reactance in the frequency range of the carrier wave, and to have a high reactance relative to resistor 35 in the range of modulating frequencies. As has already been stated, the equivalent reactance offered by device 17 in channel 1, and, similarly, that offered by device 17′ in channel 2, is dependent upon the biasing voltage supplied to the control electrodes of these devices. The feedback connections are phased to vary this bias, and thereby the equivalent reactance offered by these devices, in a direction to cause the tuning points of circuits 10 and 10′, respectively, to shift in the direction of the frequency swing which caused the output voltage.

Referring to Fig. 2, curve 40 illustrates the frequency response characteristic of channel 1 without feedback, the amplitude of the detected output voltage being plotted as ordinate, while the instantaneous frequency of the input voltage is plotted as abscissa. Channel 1 is tuned to have a maximum response at frequency $f_1$, and the curve shows the results of removing the audio feedback connection to the control electrode of modulator tube 17 by opening switch 34. Similarly, curve 41 represents the frequency response characteristic of channel 2, without feedback, when it is tuned to a frequency $f_2$, displaced by the same amount above the carrier frequency $f_c$, as frequency $f_1$ is displaced below it. Due to the fact that the crystal rectifier in channel 2 is reversed in polarity from that in channel 1, curve 40 corresponds to a signal of positive polarity while curve 41 corresponds to a signal of negative polarity.

The output voltage at terminal 33, resulting from the series addition of the output voltages from the rectifiers of both channels, is illustrated by curve 42, for the case where feedback is removed through the opening of switch 29. This curve is simply the resultant of the addition of curves 40 and 41 with reversed polarity. It will be observed that the linear portion of the curve occurring between frequencies $f_1$ and $f_2$ is relatively narrow. Closing switch 34 permits devices 17 and 17′ to operate as variable reactance modulators. As has been stated previously, the magnitudes of the equivalent reactances vary always in a direction to shift the tuning points of both circuits in the direction of the instantaneous frequency swing of the carrier. The resultant dynamic operating characteristic under these conditions is illustrated by the dotted curve 43 in Fig. 3. Although both channels are still individually tuned to frequencies $f_1$ and $f_2$ respectively, the effective tuning points have been, to all intents and purposes, shifted to the frequencies $f_3$ and $f_4$ respectively. This causes a lengthening of the linear portion of the demodulation characteristic and enables the circuit to faithfully demodulate a much greater frequency swing of the carrier wave than would otherwise be possible.

While a specific embodiment has been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States, is:

1. A detector circuit for demodulating a frequency modulated carrier wave, comprising a pair of similar amplifying channels, each of said channels comprising a resonant circuit, a reactance modulator connected in parallel therewith and an amplitude detector connected across said resonant circuit, said channels being tuned to resonance at frequencies equally spaced from and on either side of the center frequency of said wave, connections to combine the output voltages from said detector circuits in series-aiding relationship, and a feedback connection to apply a portion of said combined output voltages to said reactance modulators to shift the tuning points of said circuits in the direction of the instantaneous frequency deviation of said carrier wave.

2. A detector circuit for demodulating a frequency modulated carrier wave, comprising a pair of similar amplifying channels, each of said channels comprising a resonant circuit, a reactance modulator, said reactance modulator comprising an electron discharge device having an output circuit connected in parallel with said resonant circuit and an input circuit connected to said resonant circuit through a network providing substantially a ninety degree phase shift, and an amplitude detector connected across said resonant circuit, said channels being tuned to resonance at frequencies equally spaced from, and on either side of the center frequency of said wave, connections to combine the output voltages from said detector circuits in series-aiding relationship to produce a resultant output voltage, and a feedback connection to apply a portion of said resultant voltage to the input circuits of said reactance modulators to vary the tuning points of said circuits in the direction of the instantaneous frequency deviation of said carrier wave.

3. A detector circuit for demodulating a frequency modulated carrier wave, comprising a pair of similar amplifying channels, each of said channels comprising a parallel resonant circuit, a reactance modulator, said reactance modulator comprising an electron discharge device having an anode, a cathode and a control electrode, said anode and cathode being connected across said resonant circuit and said control electrode being connected to said resonant circuit through a network providing substantially a ninety degree phase shaft throughout the frequency range of said wave, whereby said reactance modulator provides a quadrature current to said resonant circuit and operates as an equivalent reactance in parallel therewith, the magnitude of said equivalent reactance varying in accordance with a bias voltage provided to said control electrode, and an amplitude detector, said resonant circuits, in combination with their respective reactance modulators, being tuned to resonance at frequencies equally spaced from and on either side of the center frequency of said wave, connections to combine the output voltages from said detector circuits in series-aiding relationship to produce a resultant output voltage, and a feedback connection to apply a portion of said resultant voltage to the control electrodes of both said reactance modulators to vary their bias voltage so as to shift the tuning of said resonant circuits in the direction of the instantaneous frequency deviation of said carrier wave.

4. A detector circuit for demodulating a frequency modulated carrier wave, comprising a pair of similar amplifying channels, each of said channels comprising an amplifying device having an input circuit adapted to receive said wave and a tuned output circuit, a reactance modulator comprising an electron discharge device having an anode, a cathode and a control electrode, said anode and cathode being connected across said output circuit and said control electrode being connected to said output circuit through a network providing substantially a ninety degree phase shift throughout the frequency range of said wave, whereby said reactance modulator provides a quadrature current to said output circuit and operates as an equivalent reactance in parallel therewith, the magnitude of said equivalent reactance varying proportionately to a bias voltage provided to said control electrode, and an amplitude detector connected across said output circuit, both said output circuits, in combination with their respective reactance modulators, being tuned to resonance, at frequencies equally spaced above and below the center frequency of said wave, connections to combine the output voltages from both said detector circuits so that resultant signals of opposite polarities are produced at said resonance frequencies, a feedback connection to apply a portion of said signals to the control electrodes of both said reactance modulators to vary their bias voltage in a sense to shift the tuning of said output circuits in the direction of the instantaneous frequency deviation of said carrier wave, thereby effectively widening the spacing between said resonance frequencies and extending the range of frequencies throughout which said detector circuit has a linear demodulation characteristic.

JAMES F. WILCOX.

REFERENCES CITED

The following references are of record in the file of this patent:

UNITED STATES PATENTS

| Number | Name | Date |
|---|---|---|
| 2,304,377 | Roberts | Dec. 8, 1942 |
| 2,412,039 | Fyler | Dec. 3, 1946 |